FIG-1

Dec. 15, 1970     C. J. DABROWSKI     3,548,387
BONUS CREDITING SYSTEM
Filed Sept. 12, 1968     5 Sheets-Sheet 4

INVENTOR
CASIMER J. DABROWSKI
BY

United States Patent Office 3,548,387
Patented Dec. 15, 1970

3,548,387
BONUS CREDITING SYSTEM
Casimer J. Dabrowski, Mount Prospect, Ill., assignor, by mesne assignments, to The Seeburg Corporation, Chicago, Ill., a corporation of Delaware
Filed Sept. 12, 1968, Ser. No. 759,270
Int. Cl. G11c *19/00;* G07f *5/22*
U.S. Cl. 340—173                                    14 Claims

ABSTRACT OF THE DISCLOSURE

A vending apparatus includes an arrangement for granting a bonus credit upon the accumulation of a certain level of credit in the vending apparatus accumulator, regardless of the size of individual credit increments or the order in which the individual credit increments are accumulated. A series of flip-flop circuits and logic elements are utilized to analyze and store input credit information and provide a bonus crediting pulse.

BACKGROUND OF THE INVENTION

Field of the invention

This invention generally relates to the granting of bonus credit upon accumulation of a certain amount of credit, and more specifically this invention relates to a certain arrangement of binary elements to produce bonus credits when a certain amount of credit has been accumulated by the depositing of coins in a vending apparatus.

Description of the prior art

In the past, the accumulation of credit has usually been achieved with mechanical or electromechanical devices. Similarly, the devices for awarding bonus credits upon a large amount of money being deposited utilize the same mechanical or electromechanical components as the basic accumulator. Regardless of the type of system utilized, including the few electronic accumulators developed, bonus credits were usually based upon the depositing of a single coin having a certain predetermined value (e.g., a quarter or a half dollar). In view of the fact that earlier prior art vending machines did not provide for vending based upon accumulated value of different denomination coins, such an approach was quite workable and generally accepted. However, with more sophisticated modern techniques of coin detecting and crediting, this simplified approach is no longer as acceptable. The customer wonders why he should get a bonus credit when he deposits a quarter, but not when he deposits two dimes and a nickel, although he gets the same primary vending credit. Also, the operator of the location at which the vending apparatus is located wants to entice customers by granting bonus credits regardless of how the bonus credit level is reached.

SUMMARY OF THE INVENTION

The disadvantages of having a bonus credit based upon coin denomination rather than total accumulated credit is obviated by the present invention. Briefly, in the preferred embodiments described herein, the present invention involves an arrangement for counting credit increments and storing the total of the counted credit increments. When a certain number of credit increments have been counted and stored, a bonus credit signal is produced and the bonus crediting arrangement is automatically reset to its initial state.

The bonus crediting circuit essentially performs its counting and storing functions in parallel with the primary accumulating circuit utilized in the vending apparatus. Basically, the bonus crediting circuit utilizes flip-flop circuits, AND logic gates, NAND logic gates, and delay elements to produce the desired functions. The flip-flop circuits utilize an inverted feedback from the output and not output terminals to provide input signals for the flip-flop circuit. These input signals are toggled to the output terminals by pulses representative of credit increments. The incoming credit increment pulses toggle the various flip-flop circuits and provide input signals for the various logic gates. When a given bonus credit level has been reached, a bonus credit pulse is provided and the circuit is reset to its initial state. The bonus crediting pulse is also applied to a supplementary bonus crediting circuit utilized to provide a second bonus crediting pulse when a second bonus credit level is reached. Provision is also made for resetting the entire bonus crediting arrangement to its initial state upon the initiation of a vend operation or upon the initiation of a new crediting sequence.

One of the new fields of electronic circuitry that is currently receiving considerable attention is the integrated circuit domain, particularly the most recent monolithic integrated circuits which involve a direct diffusion of circuit functions rather than lumped parameter circuit components. Many of the advantages of the monolithic integrated circuitry are of use in the credit control field, and thus the present invention involves a circuit arrangement that is particularly adapted for use in an integrated circuit form, although, of course, the utilization of the circuit of this invention is not limited to its integrated circuit version.

Accordingly, it is a primary object of this invention to provide a bonus crediting arrangement that grants a bonus credit at a specified credit level regardless of how that credit level is reached.

Another object of this invention is to provide a purely electronic bonus crediting arrangement.

Yet another object of this invention is to provide a bonus crediting arrangement that is particularly adaptable for use with monolithic integrated circuit techniques.

A further object of this invention is to provide a very compact, extremely fast acting, sturdy and reliable bonus crediting arrangement.

These and other objects, advantages, and features of the subject invention will hereinafter appear, and for purposes of illustration, but not of limitation, exemplary embodiments of the subject invention are shown in the appended drawing.

DESCRIPTION OF THE PREFERRED EMBODIMENTS

The bonus credit award system toward which this application is directed may be better understood by reference to the drawing hereof. Specifically, in FIG. 1 a schematic logic diagram of a preferred embodiment of this invention illustrates the features hereof.

This description is based on the assumption that separate credit pulses, each representative of a particular credit value (e.g., nickel, dime, or quarter), are to be utilized by a customer in establishing credit equal to a given purchase price. Each of the credit values will be equivalent to a specified number of credit increments, with a credit increment being assigned for each five cents of value. With specific reference to FIG. 1, a pulse representative of a nickel or one credit increment is applied to line 11, a pulse representative of a dime or two credit increments is applied to line 13, and a pulse representative of a quarter or five credit increments is applied to line 15.

Figure 1:
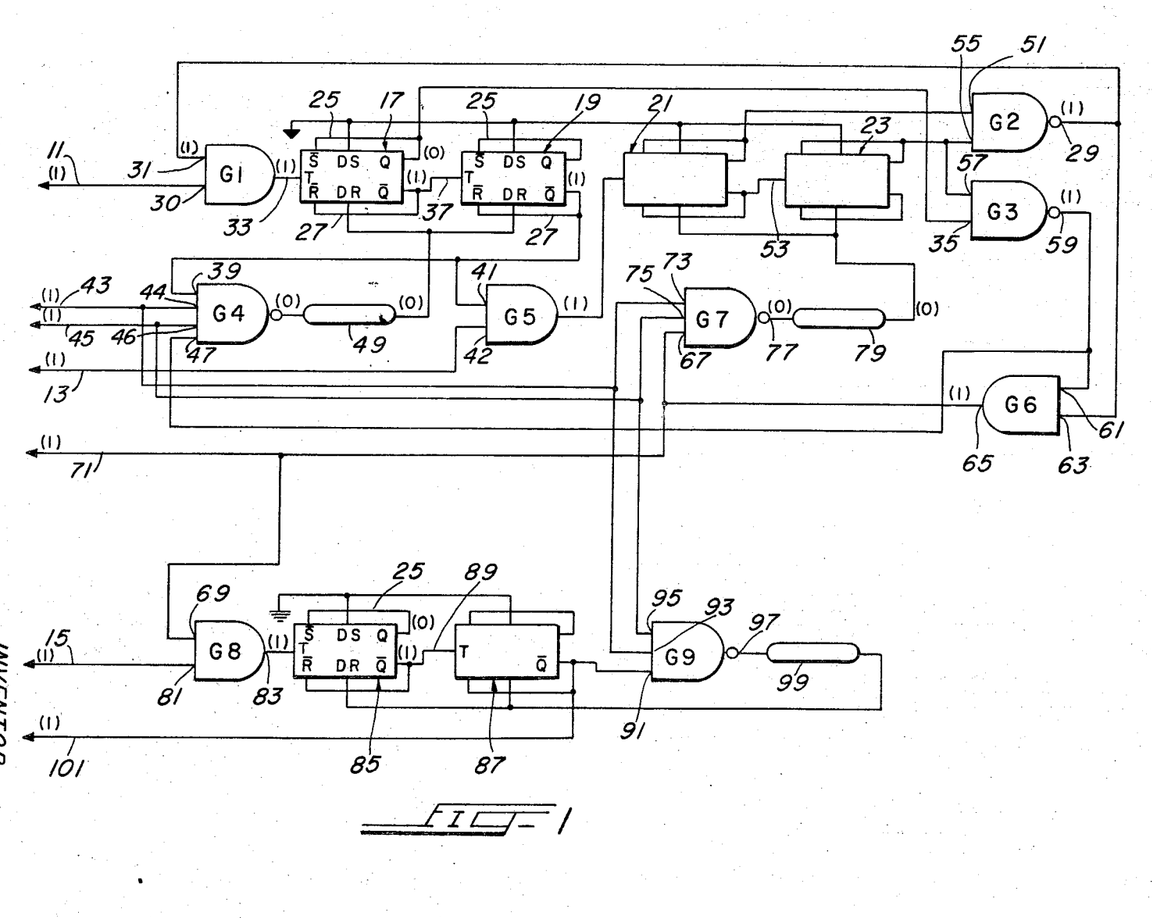
FIG. 1 is a schematic circuit diagram of a preferred embodiment of this invention.

The preferred embodiment illustrated in FIG. 1 basically utilizes four bistable circuits 17, 19, 21, and 23 commonly referred to as "flip-flops." Each of the flip-flops 17, 19, 21, and 23 has seven terminals. These seven terminals may be identified as: a toggle terminal T; a not set terminal $\bar{S}$; a not reset terminal $\bar{R}$; an output terminal Q; a not output terminal $\bar{Q}$; a direct set terminal DS; and a direct reset terminal DR. Each of the not set terminals $\bar{S}$ is directly connected to its associated output terminal Q by a lead 25. Similarly, each not reset terminal $\bar{R}$ is directly connected to its associated not output terminal $\bar{Q}$ by lead 27. By appropriately arranging the internal connections, the terminals $\bar{R}$ and $\bar{S}$ have signals appearing thereon that are the converse of those appearing on the Q and $\bar{Q}$ terminals, respectively (i.e., if a "1" is on terminal $\bar{R}$ a "0" is on terminal Q, etc.). Actuation of toggle terminal T shifts or "toggles" the signals on $\bar{R}$ and $\bar{S}$ to terminals Q and $\bar{Q}$ respectively. The direct set terminal DS is connected directly to ground, thus removing it from the circuit operation for all practical purposes. Direct reset terminal DR is adapted, upon energization, to place the flip-flops in their "false" state (i.e., the Q terminal is at "0" and the $\bar{Q}$ terminal is at "1"), which is being utilized as the initial or quiescent condition.

Single credit increment pulses appearing on line 11 are passed to an input 30 of an AND gate G1. A second input 31 for AND gate G1 is supplied with a signal obtained from an output 29 of a NAND gate G2. Since a NAND gate produces an output the inverse of that which would be produced by an AND gate, the output of gate G2 in the quiescent state is a "1." Therefore, the arrival of a "0" pulse on line 11 when G2 is in the quiescent state causes the production of a "0" on the output 33 of AND gate G1. The pulse appearing on line 33 is connected to the toggle terminal T of flip-flop 17. Toggling of the flip-flops is achieved by the trailing edge of a "0" pulse (i.e. a 0–1 transition), and thus reference to a "0" pulse in connection with a toggling action (or a toggling pulse) means a complete 1–0–1 sequence.

Output terminal Q of flip-flop 17 is connected to an input 35 of a NAND gate G3. The not output terminal $\bar{Q}$ of flip-flop 17 is connected to the toggle terminal T of flip-flop 19 by a lead 37. The not output terminal $\bar{Q}$ of flip-flop 19 is connected to an input 39 of a NAND gate G4 and to an input 41 of an AND gate G5.

A reset line 43 and a debit reset line 45 are connected to inputs 44 and 46, respectively, of NAND gate G4. In addition, the output 59 of NAND gate G3 is connected to an input 47 of NAND gate G4. The output of NAND gate G4 is fed to a delay element 49. Delay element 49 will retard the propagation of the output signal from NAND gate G4 for a specified time duration depending upon the requirements of the circuit. In this preferred embodiment, delay element 49 introduces a ten microsecond delay. The output of delay element 49 is then connected to the direct reset terminals DR of flip-flops 17 and 19.

Reset line 43 and debit reset line 45 both act to reset all the flip-flop elements to the quiescent condition when a 1–0–1 sequence of pulses is placed on either reset line 43 or debit reset line 45.

Since each of the inputs to NAND gate G4 is ordinarily a "1," the output of gate G4 is normally a "0." If any of the inputs to NAND gate G4 goes to a "0," the output becomes a "1" which is fed through the delay element 49 to the direct reset terminal DR of flip-flops 17 and 19. A "1" appearing on the direct reset terminal DR of flip-flops 17 and 19 drives these flip-flops to the quiescent state (i.e., a "0" on output terminal Q and a "1" on the not output terminals $\bar{Q}$). Thus, when a reset source or a debit reset source produces a 1–0–1 series of pulses on either of the lines 43 or 45, flip-flops 17 and 19 will be driven to the quiescent state. Further, if a toggling pulse is applied to the toggle terminal T of flip-flop 19, the not output $\bar{Q}$ of that flip-flop will go to the "0" state and cause flip-flops 17 and 19, after a ten microsecond delay due to element 49, to be reset to the quiescent state.

As previously indicated, the $\bar{Q}$ terminal of flip-flop 19 is also connected to the input 41 of AND gate G5. The credit increment on line 13 is also connected to an input 42 of gate G5. Since both the $\bar{Q}$ terminal and the two credit increment lines normally produce a "1" the output of gate G5 is normally a "1." However, when flip-flop 19 is triggered by a "0" pulse on toggle terminal T, the resulting change in $\bar{Q}$ from a "1" to a "0" causes the output of gate G5 to go to "0," and, when flip-flop 19 is reset as described above, flip-flop 21 is triggered to produce a "1" at the Q terminal and a "0" at the $\bar{Q}$ terminal. The "1" at the Q terminal of flip-flop 21 is applied to an input 51 of NAND gate G2. The $\bar{Q}$ terminal of flip-flop 21 is connected to toggle terminal T of flip-flop 23 by a lead 53. The output terminal Q of flip-flop 23 is connected to an input 55 of NAND gate G2 and to an input 57 of NAND gate G3. Since the inputs of gate G3 are connected to the Q terminals of flip-flops 17 and 23, both input 35 and input 57 of gate G3 has a "0" thereon in the quiescent state. Therefore, output 59 of NAND gate G3 is a "1" in the quiescent state.

As previously indicated, output 59 of gate G3 is connected to input 47 of NAND gate G4. In addition, output 59 of NAND gate G3 is also connected to an input 61 of an AND gate G6. Another input 63 of AND gate G6 is connected to the output 29 of NAND gate G2. Since both the output 29 of NAND gate G2 and the output 59 of NAND gate G3 have a "1" thereon in the quiescent state, output 65 of AND gate G6 also has a "1" thereon in the quiescent state.

Output 65 of AND gate G6 is connected to an input 67 of a NAND gate G7 and an input 69 of an AND gate G8. The signal at output 65 of gate G6 also serves as a bonus crediting pulse, connected to bonus crediting circuitry by line 71.

Reset line 43 and debit reset line 45 are also connected to gate G7 at inputs 73 and 75 respectively. Similarly to the case of NAND gate G4, output 77 of NAND gate G7 is connected to direct reset terminals DR of flip-flops 21 and 23 through the delay element 79. Delay element 79 corresponds to delay element 49 and provides the same ten microsecond delay.

In addition to being connected to the output 65 of AND gate G6, AND gate G8 has input 81 connected to the five credit increment line 15. Output 83 of AND gate G8 is connected to the toggle terminal T of a flip-flop 85. Flip-flop 85 and a companion flip-flop 87 are the same type of devices as flip-flops 17, 19, 21, and 23. The not output terminal $\bar{Q}$ of flip-flop 85 is connected to the toggle terminal T of flip-flop 87 by a lead 89. Not output terminal $\bar{Q}$ of flip-flop 87 is connected to an input terminal 91 of a NAND gate G9. Input terminals 93 and 95 of NAND gate G9 are connected to the reset line 43 and debit reset line 45, respectively. The output 97 of NAND gate G9 is connected to the direct reset terminals DR of flip-flops 85 and 87 through a ten microsecond delay element 99. The $\bar{Q}$ output of flip-flop 87 also provides a two bonus output pulse on line 101.

To illustrate the operation of this bonus crediting system, a specific example is helpful. For purposes of this portion of the discussion, it is assumed that a customer deposits three nickels, a dime and a quarter, in that sequence, to obtain the phonograph selections or the other vendable item or items that he desires to purchase. It will also be assumed that it is desired to give one bonus credit increment for each five credit increments accumulated (twenty-five cents) and four bonus credit increments for each ten credit increments accumulated (fifty cents). To also assist in describing the operation of this circuit, the signal levels in the quiescent state at a number of points in the circuit have been indicated in parentheses.

Upon deposit of the first nickel, a "0" toggling pulse will appear on line 11 and be applied to input 30 of AND gate G1. Gate G1 then produces a "0" output which is applied to toggle terminal T of flip-flop 17 to toggle that flip-flop so that a "1" appears on output terminal Q and a "0" appears on not output terminal $\bar{Q}$. The "1" on output terminal Q is applied to input 35 of NAND gate G3, but since the output terminal Q of flip-flop 23 retains a "0" thereon, the state of gate G3 is not altered. Also, as flip-flop 19 is toggled by the trailing edge of the "0" pulse (i.e., the 0–1 transition), the transition of not output terminal $\bar{Q}$ from a "1" state to a "0" state does not produce any immediate results.

Deposits of a second nickel produces another "0" pulse on line 11 and causes flip-flop 17 to be toggled to return the Q and $\bar{Q}$ terminals to their quiescent state conditions. The "0" pulse appearing on the $\bar{Q}$ terminal toggles flip-flop 19 to produce a "0" pulse on the $\bar{Q}$ terminal of flip-flop 19. The "0" appearing on the $\bar{Q}$ terminal of flip-flop 19 is conveyed to the input 39 of NAND gate G4 to produce a "1" pulse on the output of gate G4. Ten microseconds later, due to the delay introduced by element 49, this "1" appears on the direct set terminal DS of flip-flops 17 and 19, thus resetting them to their quiescent state (i.e., the $\bar{Q}$ terminal has a "1" thereon and the Q terminal has a "0" thereon). The 1–0–1 sequence of the $\bar{Q}$ terminal of flip-flop 19 is conveyed to the input 41 of AND gate G5 to produce a "0" pulse on the output of G5 to toggle flip-flop 21. Toggling flip-flop 21 transfers the "1" on the $\bar{R}$ terminal to the Q terminal. The "1" appearing on the Q terminal of flip-flop 21 is applied to input 51 of NAND gate G2, but does not change the state of that gate since the "0" from the Q terminal of flip-flop 23 is connected to an input 55 of gate G2. Also, the "0" appearing on the $\bar{Q}$ terminal of flip-flop 21 produces no result, since flip-flop 23 can only be toggled by a 0–1 transition.

As a third nickel is deposited, the single credit increment pulse appearing on line 11 again toggles flip-flop 17 to transfer the "1" on the $\bar{R}$ terminal to the Q terminal and the "0" on the $\bar{S}$ terminal to the $\bar{Q}$ terminal. Thus, a "1" again appears on input 35 of NAND gate G3, although it still does not alter the "1" appearing on output 59 of gate G3.

Deposit of a dime by the customer produces a "0" pulse on the two credit increment line 13. This pulse is applied to AND gate G5, which produces a "0" on the output thereof to toggle flip-flop 21. Since flip-flop 21 has previously been toggled as a result of the deposit of the second nickel, this returns flip-flop 21 to its quiescent state. As flip-flop 21 returns to the quiescent state, the 0–1 transition of the $\bar{Q}$ terminal thereof triggers flip-flop 23 to toggle the "1" on the $\bar{R}$ terminal and the "0" on the $\bar{S}$ terminal to the Q and $\bar{Q}$ terminals respectively. The "1" appearing on the Q terminal of flip-flop 23 is conveyed to input 55 of NAND gate G2. However, the output of gate G2 is not affected, since the signal from the Q terminal of flip-flop 21, which is applied to input 51 of gate G2, has returned to the "0" state.

The "1" on the Q terminal of flip-flop 23 is also connected to input 57 of NAND gate G3. This produces a "0" on the output 59 of gate G3, which is then conveyed to the input 47 of NAND gate G4 to reset the flip-flops 17 and 19 to the quiescent state. The "0" pulse on the output of gate G3 is also conveyed to AND gate G6 to produce a "0" on the output 65 thereof. This pulse is fed via line 71 to the bonus crediting circuit to give a bonus of one credit increment. The "0" pulse on the output 65 of gate G6 is also applied to input 69 of AND gate G8 to produce a "0" on output 83. Flip-flop 87 is similar to flip-flops 17, 19, 21 and 23 in that toggling thereof is achieved by application of a 0–1 transition, and thus the "0" appearing on the $\bar{Q}$ terminal of flip-flop 85 and conveyed to the trigger terminal of flip-flop 87 does not have any effect. In addition to the previously described routes, the "0" on output 65 of gate G6 is also conveyed to input 67 of NAND gate G7 to reset flip-flops 21 and 23. At this point, flip-flops 17, 19, 21, and 23 have all been reset after the registering of a bonus credit increment resulting from accumulation of five credit increments. Therefore, the outputs of NAND gates G2 and G3 are again at "1" and the resulting "1" on output 65 of AND gate G6 causes the output of AND gate G8 to return to "1," thereby toggling flip-flop 85 with the 0–1 transition.

If a quarter is now deposited, as has been hypothesized, a "0" on line 15 is applied to input 81 to again toggle flip-flop 85. As explained hereinafter, deposit of a quarter automatically causes a bonus credit to be given. Due to the fact that flip-flop 85 had previously been toggled by the five credit increment bonus accrediting pulse, flip-flop 85 is returned to the quiescent state. As flip-flop 85 is returned to the quiescent state the 0–1 transition appearing on the $\bar{Q}$ terminal thereof is conveyed through line 89 to toggle flip-flop 87. The resulting "0" on the $\bar{Q}$ terminal of flip-flop 87 is conveyed to the bonus accrediting circuitry on line 101 to register two bonus credit increments. The "0" on the $\bar{Q}$ terminal of flip-flop 87 is also conveyed to input 91 of NAND gate G9 to reset flip-flops 85 and 87 to the quiescent state. Thus, fifty cents (ten credit increments) has been accumulated, four bonus credit increments given therefor, and the credit accumulated in the bonus circuit has been cancelled.

While this description was undertaken with respect to the specific number of coins and the specific coin depositing sequence indicated above, it should be recognized that one bonus credit increment will be given for every five credit increments accumulated and four bonus credit increments will be granted for every ten credit increments accumulated, regardless of the types of coins or the order in which they are deposited utilized in reaching either of these credit levels.

Figure 2:
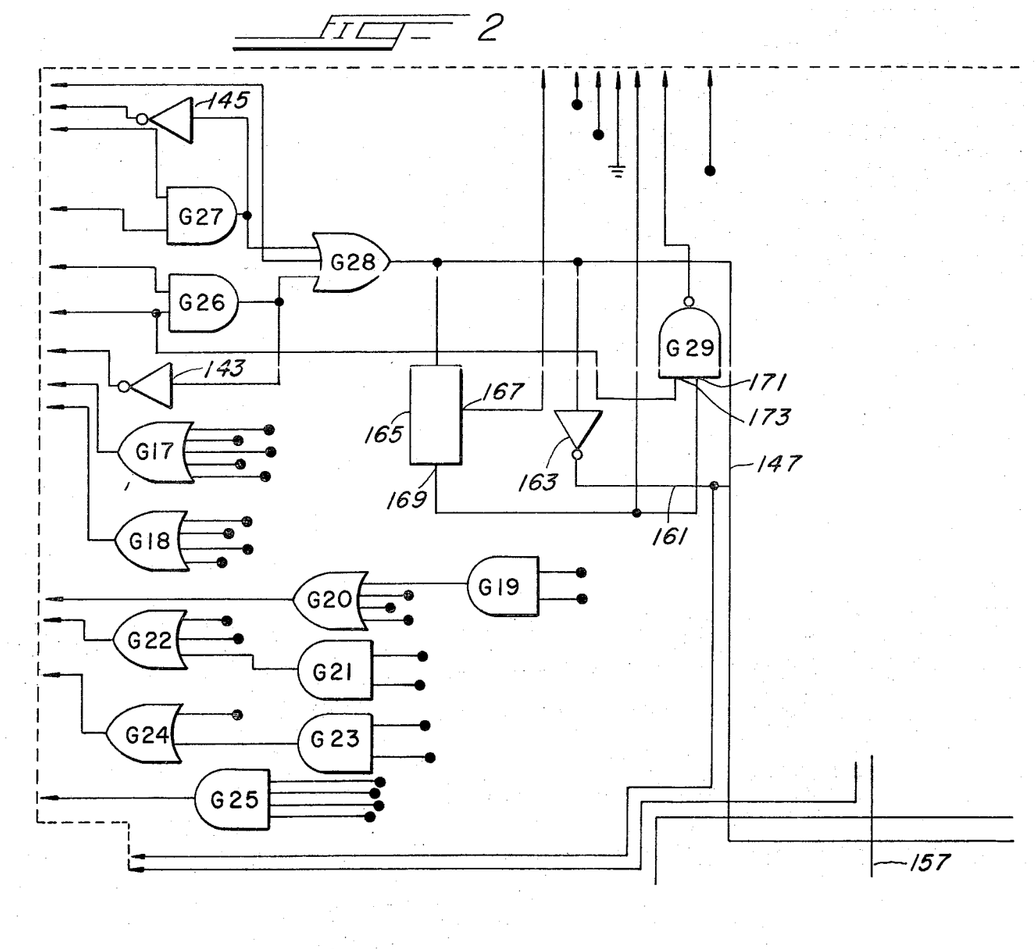
FIGS. 2, 3, and 4 jointly form a schematic circuit diagram of a circuit incorporating another preferred embodiment of this invention.
Figure 3:
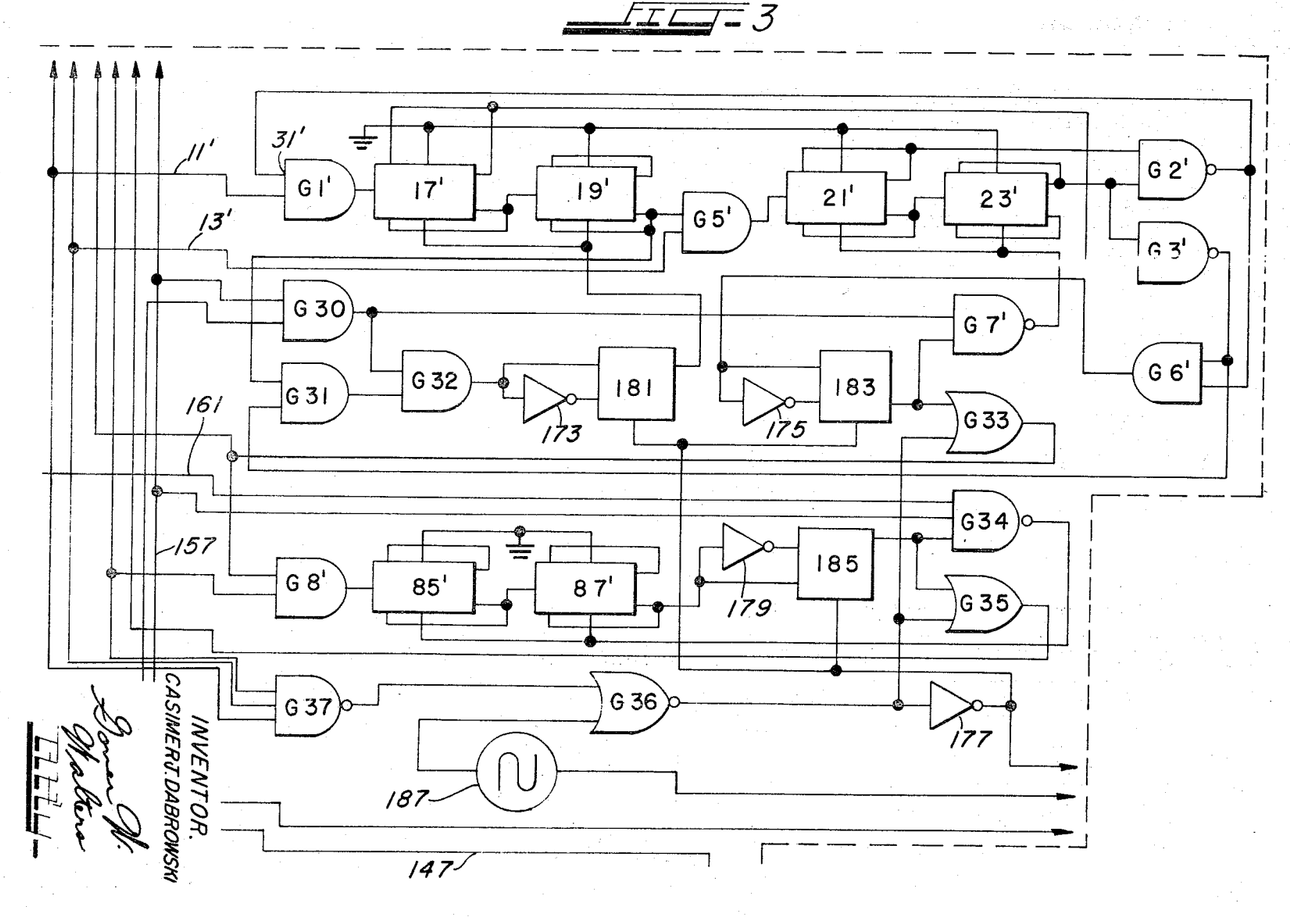
Figure 4:
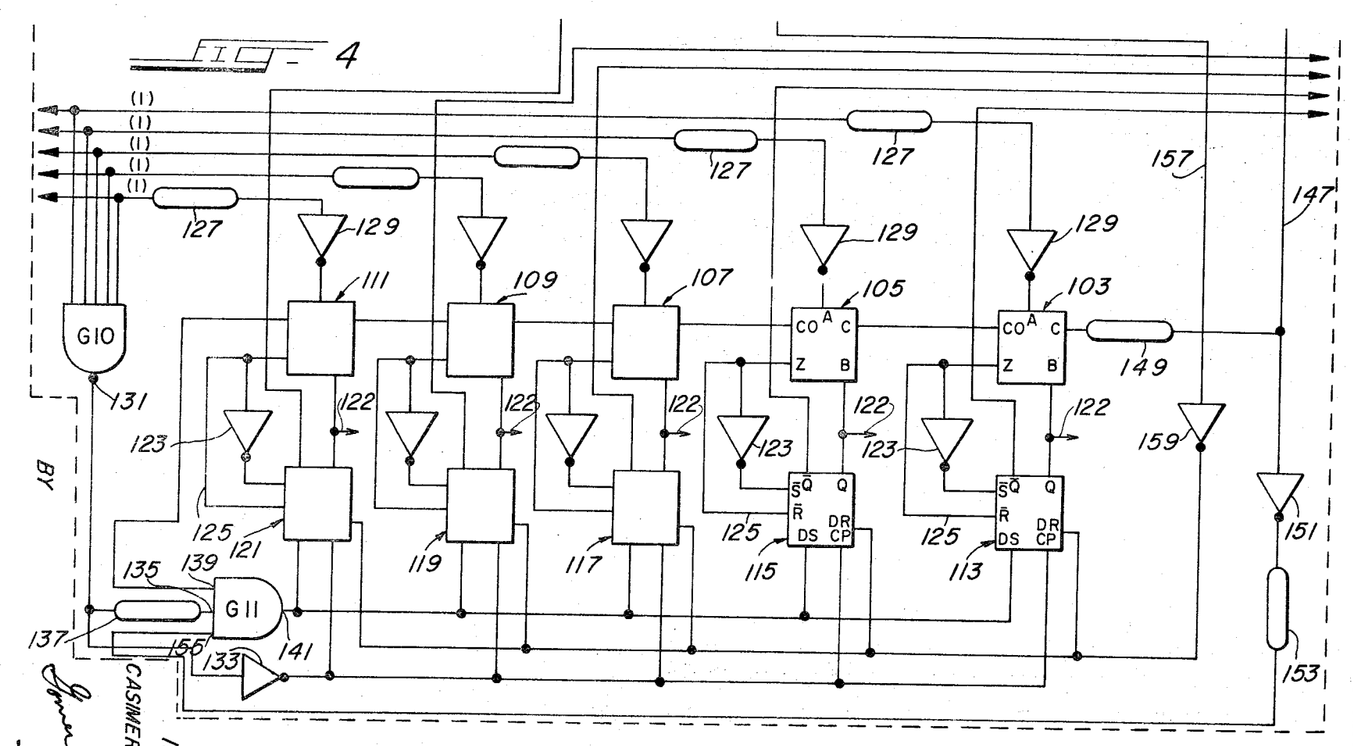
Figure 5:
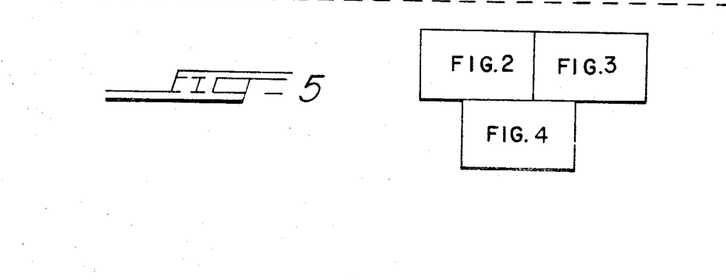
FIG. 5 illustrates the relationship between FIGS. 2, 3, and 4.

While a preferred embodiment of the invention to which this application is directed has been described, the operation thereof may be more completely understood by reference to FIGS. 2–4 which illustrate another embodiment of the bonus circuit of this invention as incorporated in a pricing unit. This pricing unit has been especially designed for construction as a monolithic integrated circuit package. The relationship of the individual portions of the circuit illustrated in FIGS. 2–4 is depicted in FIG. 5.

The basic accumulator with which the bonus generating system is utilized comprises a plurality of stages with each stage including the combination of a binary full adder and a flip-flop circuit. Binary full adders 103, 105, 107, 109, and 111 are combined, respectively, with flip-flops 113, 115, 117, 119, and 121. The flip-flops are essentially the same as those previously discussed in connection with the bonus generating system. The binary full adders are electronic devices that perform arithmetic binary addition, including a carry function to preserve multiple column veracity. In this circuit, the full adder has been combined with a flip-flop circuit to provide arithmetic accumulation of credit inputs.

Each of the binary full adders 103, 105, 107, 109, and 111 has three input terminals, the two primary input terminals A and B and the carry input terminal C. The basic output of the full adders is obtained at the terminal Z, while information regarding the credit that must be carried over to the next stage appears on terminal CO.

The Z terminal of each of the binary full adders is connected to the not set terminal $\bar{S}$ of the associated flip-flop through an inverting amplifier 123. Further, each Z terminal is also connected directly by a lead 125 to the not reset terminal $\bar{R}$ of the associated flip-flop. Each of the binary full adders receives a pulse representative of a specific credit increment on its A terminal through a delay element 127 and an inverting amplifier 129.

Each of the credit increment input pulses going to the binary full adders is also applied to a NAND gate G10. Output 131 of NAND gate G10 is connected to the CP terminals of the flip-flops through an inverting amplifier 133. The CP terminals of the flip-flops are those by which toggling of the flip-flop circuit is controlled. The output 131 of NAND gate G10 is also connected to an input 135 of an AND gate G11 through a delay element 137. Another input 139 of AND gate G11 is connected to the CO terminal of full adder 111. Output 141 of AND gate G11 is connected to the direct set terminals DS of the flip-flops 113, 115, 117, 119, and 121.

In operation, an input signal will be applied, for example, to the A terminal of binary full adder 103. Assuming that the circuit is in its quiescent state, the B and C terminals will each have a "0" thereon. Binary addition of the "1" appearing on terminal A with the "0" on terminals B and C results in the production of an output pulse "1" on terminal Z. The "1" on terminal Z is then conveyed to the $\bar{S}$ and $\bar{R}$ terminals of flip-flop 113, and the "1" on the $\bar{S}$ terminal and the "0" on the $\bar{R}$ terminal are toggled to the Q and $\bar{Q}$ terminals respectively upon pulsing of the CP terminal by the trailing edge of the applied pulse that is fed through NAND gate G10 and inverting amplifier 133. Upon the application of another "1" to the same full adder, the "1" on the A and B terminals are added to produce a "0" on the Z terminal and a "1" on the CO terminal. Insertion of additional inputs representative of credit increments will result in continued accumulation of credit increments up to a maximum of thirty-one.

Each of the credit values that is inserted by a customer (i.e., nickels, dimes, or quarters) is applied to the appropriate full adder stages to give the required credit increment information that is needed for accumulation. This feature may be better comprehended by reference to FIG. 6, in which the production of pulses for conveyance to the full adders is illustrated. It should be noted that the delay elements 127 have been omitted for purposes of the FIG. 6 description.

Figure 6:
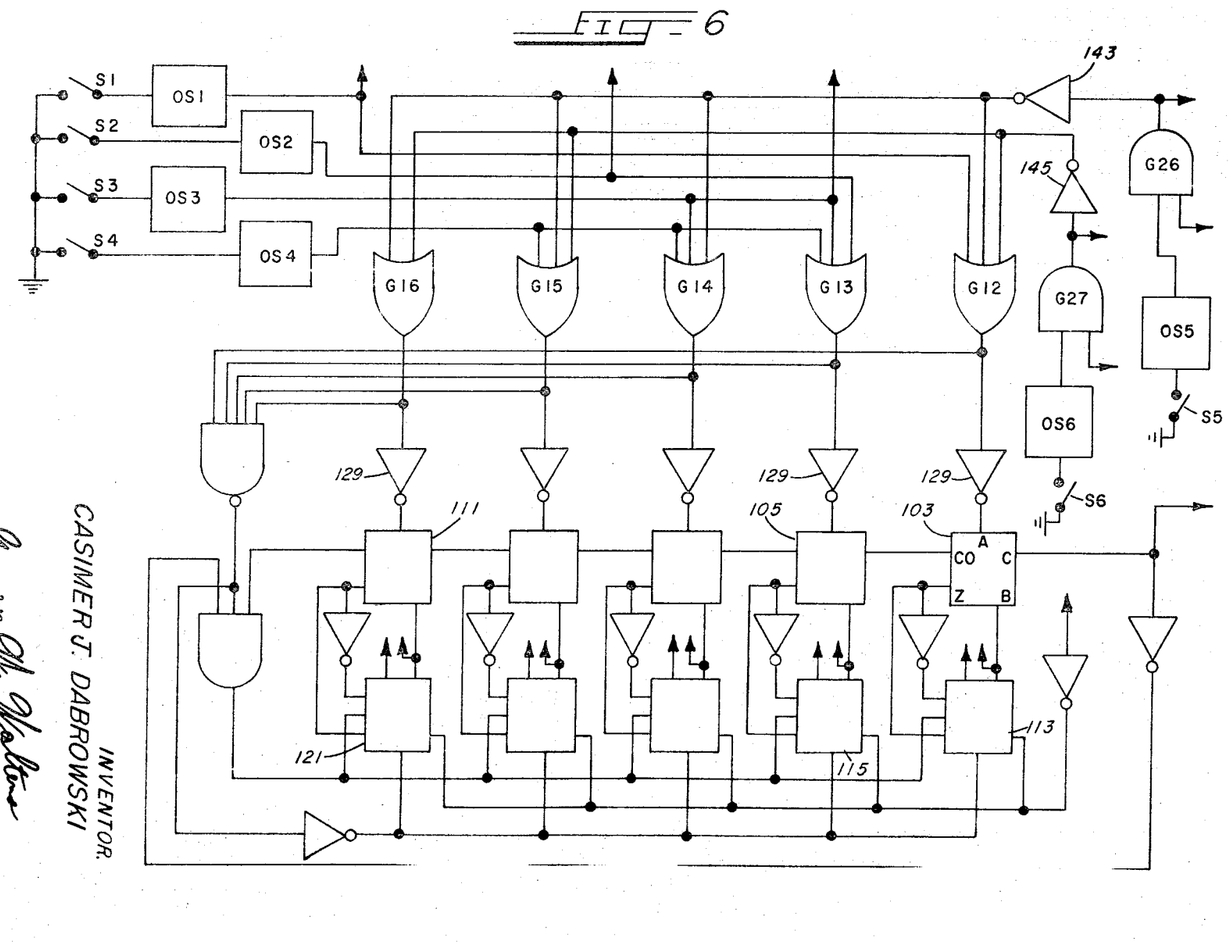
FIG. 6 is a schematic circuit diagram illustrating other features of a preferred embodiment of this invention.

Credit information for the system is obtained from input switches S1–S4 and their respective one shot circuits OS1–OS4. The switches S1–S4 will be actuated, for example, by a nickel, a dime, a quarter, and a half dollar respectively. Upon closure of any of the switches, a pulse is produced and shaped by the associated one shot circuit and conveyed to the appropriate inputs of the OR gates G12–G16. The OR gates G12–G16 are connected to the A terminals of full adders 103, 105, 107, 109, and 111, respectively. The connection of the one shot circuits OS1–OS4 to the OR gates G12–G16 is dependent upon the number of credit increments that are represented by each of the full adder stages connected to the OR gates. The stage including binary full adder 103 is representative of one credit increment, the stage including full adder 105 is representative of two credit increments, the stage containing full adder 107 represents four credit increments, the stage including full adder 109 represents eight credit increments, and the stage including full adder 111 represents 16 credit increments. Therefore, to have the appropriate number of credit increments accumulated, the pulse from one shot OS1 produced by a nickel would be applied to G12 to be conveyed to full adder 103, the two credit increments allocated to a dime would be produced by connecting OS2 to G13, the six credit increments allocated to a quarter would be accumulated by connecting one shot OS3 to G13 and G14, and the accumulation of the fourteen credits allocated to a half dollar would be realized by connecting one shot OS4 to OR gates G13, G14, and G15.

One difficulty that might be encountered in accumulating the credit values is that more credit might be deposited than can be represented by the thirty-one credit increment maximum of the accumulator. If enough credit were deposited to exceed the thirty-one credit increment maximum, the accumulator would merely start counting from zero again, so that the customer would be deprived of a major part of the credit actually due to him. To overcome this problem, AND gate G11 (FIG. 4) is provided. If the counter should reach its maximum of thirty-one accumulated credit increments, the CO terminal of binary full adder 111 would have a "1" thereon; and since AND gate G10 would always produce a "1," a "1" would be placed on the output 141 of AND gate G11. The "1" on output 141 of AND gate G11 would be connected to the direct set terminals DS of the flip-flops 113, 115, 117, 119, and 121 to lock out the trigger pulse supplied to terminal CP and maintain the output terminal Q at a "1" state. Thus, the accumulator would be maintained in the maximum position of thirty-one counts, so that an over-depositer would at least be credited with the maximum amount that can be accumulated in the counter.

In determining whether enough credit has been deposited to permit a customer to have an article vended at a given price, it is necessary to detect the credit levels in the accumulator. The circuit arrangements utilized for performing the credit level check is illustrated in FIG. 2 and involves the gates G17–G25. In the example illustrated there, it is desired to detect credit levels at the one credit increment or greater, two credit increments or greater, three credit increments or greater, six credit increments or greater, twelve credit increments or greater, and thirty credit increments or greater. For purposes of obtaining this information, the output terminals Q of the flip-flops 113, 115, 117, 119, and 121 are utilized.

When it is desired to detect if one or more credit increments have been accumulated, the Q terminals of all of the flip-flops are connected to an OR gate 317. In the case of detecting two credit increments or greater, the Q terminals of all flip-flops are connected to an OR circuit, with the exception of the Q terminal of flip-flop 113. When it is desired to detect three credit increments or greater, the Q terminals of flip-flops 113 and 115 are connected to the inputs of an AND gate G19, the output of which is conveyed to an OR gate G20 which also has as inputs the pulses appearing on the Q terminals of flip-flops 117, 119, and 121. To determine the existence of six credit increments or greater, the Q terminals of flip-flops 115 and 117 are connected to the inputs of an AND gate G21, the output of which is connected to an OR gate G22, along with the Q terminals of flip-flops 119 and 121. For twelve credit increments or greater, the Q terminals of flip-flops 117 and 119 are connected to the inputs of an AND gate G23, the output of which is connected to an input of an OR gate G24, along with the Q terminal of flip-flop 121. To detect credit increments of thirty or greater, the Q terminals of flip-flops 115, 117, 119, and 121 are connected to the inputs of an AND gate G25.

To utilize the credit level detection arrangements, the desired credit level outputs are connected to AND gates such as G26 and G27 (FIG. 6). The other input to the AND gates would come from a selector switch and an associated one shot circuit that would represent a debit pulse corresponding to the price of the article or service selected. For example, assume that a single selection (in a coin-operated phonograph) is to be played for two credit increments and that such choice is made by pressing selector switch S5. Closure of switch S5 would produce a pulse as shaped by the one shot circuit OS5 and conveyed to an input of gate G26. For the other input to G26 the output of OR gate G18 would present a pulse if the accumulated credit had reached a level of two credit increments or greater. Thus, if sufficient credit had been deposited a pulse would appear at the output of gate G26.

The output pulse would pass through an inverting amplifier 143 to selected OR gates from the gates G12–G16. The purpose of this pulse, of course, is to subtract from the accumulator the amount debited to the selection made by the customer.

In this system, subtraction is achieved by complementary addition. Thus, for a two credit increment selection, the complement (in this thirty-one count accumulator) would be twenty-nine counts. As may be seen in FIG. 6 the pulse passing through inverting amplifier 143 is connected to OR gates G12, G14, G15, and G16, which produce a total of twenty-nine credit increments to be added to the accumulator.

As another example, still with reference to a coin-operated phonograph, an album selection might be given a value of six credit increments. Thus, depression of selector switch S6 would produce, after passing through one shot circuit OS6, a pulse at the input of gate G27, the other input to which would be taken from the output of OR gate G22. If sufficient credit has been deposited, a pulse would appear at the output of gate G27 and be conveyed through inverting amplifier 145 to add a total of twenty-five credit increments to the accumulator, and thus actually subtract six credit increments from the accumulated value.

In addition to subtracting the number of credit increments allocated to the choice made by the customer, the outputs of the AND gates G26 and G27 are also applied to an OR gate G28 (FIG. 2) to perform additional functions. A signal at the output of gate G28 is applied, through line 147 and delay element 149, to the C terminal on binary full adder 103 to provide the carry signal needed during the subtract function. A signal at the output of G28 is also connected through inverting amplifier 151 and delay element 153 to an input 155 of gate G11. A reset signal on line 157 is passed through inverting amplifier 159 and applied to the direct reset terminals DR of flip-flops 113, 115, 117, 119, and 121.

The output of OR gate G28 is also utilized to provide a reset for the bonus registering circuit on line 161 through inverting amplifier 163. Further, the signal at the output of OR gate G28 is utilized to actuate a fifty millisecond one shot circuit 165. One output of the one shot circuit 165 is utilized to control the actuation of the vend motor and its associated elements, while another output 169 is connected to an input 171 of a NAND gate G29. An input 173 for gate G29 is obtained from the input to NAND gate G26. The output of NAND gate G29 is utilized to release a selector key that has been held depressed for the fifty millisecond period in order to permit a customer to finish making a selection.

In this embodiment, the bonus generating circuit has been modified somewhat by the addition of gates G30–G37, inverting amplifiers 173, 175, 177, 178 and 179, and flip-flops 180, 183, and 185. Although this circuit appears to be substantially altered, there has actually been very little change in the mode of operation, as the primary reasons for the indicated changes is to incorporate a clock generator 187 to control the establishment of a bonus credit. The reason for including a clock circuit to control the operation of the bonus credit system is that if such a clock control is not utilized a bonus credit may overlap a credit produced to indicate a deposited credit value. In such a case, the bonus credit might be lost to the customer. The clock arrangement prevents this occurrence by spacing the registering of a bonus credit for a period of time after the entry of a credit for value deposited.

It should be understood that the embodiments described are exemplary of the preferred practice of the present invention and that various changes, modifications, and variations may be made in the arrangements, details of construction, and operations of the elements disclosed herein, without departing from the spirit and scope of the present invention.

I claim:

1. A vending apparatus having a credit accumulator wherein the improvement is a bonus crediting arrangement comprising:
   a memory circuit for accumulating and storing information representative of credit increments essentially simultaneously with the accumulating and storing of information representative of said credit increments in the credit accumulator;
   crediting means for providing a bonus credit increment representation when information equivalent to a specified number of credit increments has been accumulated;
   means for conveying said bonus credit increment representation to the credit accumulator; and
   reset means for returning said memory circuit to its initial state after a bonus credit increment representation has been conveyed to the credit accumulator.

2. A bonus crediting arrangement as claimed in claim 1 and further comprising vend reset means to return said memory circuit to its initial state after a vending operation has been initiated.

3. A bonus crediting arrangement as claimed in claim 1 wherein said memory circuit comprises flip-flop circuits in combination with logic gates.

4. A bonus crediting arrangement as claimed in claim 3 wherein:
   said flip-flop circuits have the outputs thereof fed back to corresponding inputs thereof; and
   each of said inputs is selectively connected internally to the opposite output from that to which it is externally connected, whereby toggling any of said flip-flop circuits transfers the signal on one output to the other output thereof.

5. A bonus crediting arrangement as claimed in claim 3 and further comprising:
   a direct reset terminal on each of said flip-flop circuits; and
   a delay element connected between an output of one of said flip-flop circuits and said direct reset terminals on said one flip-flop circuit and on a second flip-flop circuit.

6. A bonus crediting arrangement as claimed in claim 1 and further comprising a supplementary memory circuit actuated in response to bonus credit increment representations from said memory circuit and larger credit increment input information to provide a second bonus credit increment representation.

7. A vending apparatus having a credit accumulator wherein the improvement is a bonus crediting arrangement comprising:
   a plurality of input lines having input pulses representative of a predetermined number of credit increments appearing thereon, the input pulses on each of said input lines representing a different number of credit increments than the input pulses on other input lines;
   a memory circuit for accumulating and storing the credit increments represented by said input pulses;
   crediting means for providing a pulse representative of a bonus credit corresponding to a predetermined number of credit increments when a specified number of credit increments have been accumulated in said memory circuit;
   means for conveying said pulse representative of a bonus credit to the credit accumulator for inclusion in the total of accumulated credits; and
   reset means for returning said memory circuit to its initial state after said pulse representative of a bonus credit has been conveyed to the credit accumulator.

8. A bonus credit arrangement as claimed in claim 7 wherein said memory circuit comprises first, second, third, and fourth flip-flop circuits each having a toggle terminal and first and second output terminals, each of said flip-flop circuits being adapted when toggled to transfer the signal on said first output terminal to said second output terminal and to transfer the signal on said second output terminal to said first output terminal.

9. A bonus crediting arrangement as claimed in claim 8 wherein:
   a first one of said input lines is connected to the toggle terminal of said first flip-flop circuit;
   the second output terminal of said first flip-flop circuit is connected to the toggle terminal of said second flip-flop circuit;
   said memory circuit further comprises a first AND gate, the second output terminal of said second flip-flop circuit and a second one of said input lines providing inputs for said first AND gate, the output of said first AND gate being connected to the toggle terminal of said third flip-flop circuit; and
   the second output terminal of said third flip-flop circuit is connected to the toggle terminal of said fourth flip-flop circuit.

10. A bonus crediting arrangement as claimed in claim 8 wherein said crediting means comprises:
    first and second NAND gates, said first NAND gate receiving inputs from the first output terminals of said third and fourth flip-flop circuits, and said second NAND gate receiving inputs from the first output terminals of said first and fourth flip-flop circuits; and
    a second AND gate, said second AND gate receiving inputs from the outputs of said first and second NAND gates.

11. A bonus crediting arrangement as claimed in claim 10 wherein each of said flip-flop circuits further comprises a direct reset terminal and said reset means comprises a direct reset terminal and said reset means comprises:
    a third AND gate receiving inputs from the output of said first NAND gate and said first input line, the output of said third AND gate being applied to said toggle terminal of said first flip-flop circuit;
    a third NAND gate receiving inputs from said second output terminal of said second flip-flop circuit and from the output of said second NAND gate;
    a first delay element connected between the output of said third NAND gate and the direct reset terminals of said first and second flip-flop circuits, whereby an output signal from said second NAND gate or said second output terminal of said second flip-flop circuit will reset said first and second flip-flop circuits to their initial states after a delay determined by said first delay elements;
    a fourth NAND gate receiving an input from the output of said second AND gate; and
    a second delay element connected between the output of said fourth NAND gate and the direct reset terminals of said third and fourth flip-flop circuits, whereby an output signal from said second AND gate will reset said third and fourth flip-flop circuits after a delay determined by said second delay element.

12. A bonus crediting arrangement as claimed in claim 11 and further comprising vend reset means supplying an input for both said third and fourth NAND gates to reset all of said flip-flop circuits to their initial states after a vending operation has been initiated.

13. A bonus crediting arrangement as claimed in claim 10 and further comprising:
    a fourth AND gate receiving inputs from the output of said second AND gate and a third one of said input lines;
    fifth and sixth flip-flop circuits identical to said first, second, third, and fourth flip-flop circuits and each having a toggle terminal, first and second output terminals, and a direct reset terminal, the output of said fourth AND gate connected to the toggle terminal of said fifth flip-flop circuit, and said second output terminal of said fifth flip-flop circuit connected to the toggle terminal of said sixth flip-flop circuit;
    a fifth NAND gate receiving an input from the second output terminal of said sixth flip-flop circuit; and
    a third delay element connected between the output of said fifth NAND gate and the direct reset terminals of said fifth and sixth flip-flop circuits,
    whereby a pulse representative of an additional bonus credit may be provided when sufficient credit increments have been accumulated.

14. A bonus crediting arrangement as claimed in claim 13 and further comprising a vend reset means supplying an input for said fifth NAND gate to reset said fifth and sixth flip-flop circuits after a vending operation has been initiated.

References Cited
UNITED STATES PATENTS

| | | | |
|---|---|---|---|
| 3,387,143 | 6/1968 | Watrous | 307—225 |
| 3,042,173 | 7/1962 | Thomas | 194—15 |
| 3,082,853 | 3/1963 | Rockola | 194—15 |
| 3,149,238 | 9/1964 | Szarvas | 194—1.91 |
| 3,269,503 | 8/1966 | Foster | 194—1.91 |
| 3,279,480 | 10/1966 | Jarvis | 307—225X |
| 3,287,640 | 11/1966 | Rehage | 307—225X |
| 3,307,671 | 3/1967 | Shirley | 194—1.91 |
| 3,344,898 | 10/1967 | Klinikowski | 194—1.91 |
| 3,363,110 | 1/1968 | Kellis | 307—225 |
| 3,365,045 | 1/1968 | Guttmann | 194—1.91 |
| 3,378,698 | 4/1968 | Kadah | 307—225 |

TERRELL W. FEARS, Primary Examiner

U.S. Cl. X.R.

194—1